United States Patent
Yang

(10) Patent No.: US 11,497,032 B2
(45) Date of Patent: Nov. 8, 2022

(54) CHANNEL AND SIGNAL TRANSMISSION METHOD AND COMMUNICATION DEVICE

(71) Applicant: VIVO MOBILE COMMUNICATION CO., LTD., Guangdong (CN)

(72) Inventor: Yu Yang, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 93 days.

(21) Appl. No.: 17/039,618

(22) Filed: Sep. 30, 2020

(65) Prior Publication Data

US 2021/0022152 A1     Jan. 21, 2021

Related U.S. Application Data

(63) Continuation of application No. PCT/CN2019/080099, filed on Mar. 28, 2019.

(30) Foreign Application Priority Data

Apr. 4, 2018 (CN) .......................... 201810301846.7

(51) Int. Cl.
     *H04W 72/04*        (2009.01)
     *H04L 5/00*         (2006.01)
     *H04L 5/10*         (2006.01)
     *H04W 72/10*        (2009.01)

(52) U.S. Cl.
     CPC .......... *H04W 72/10* (2013.01); *H04L 5/0048* (2013.01); *H04L 5/0053* (2013.01); *H04W 72/042* (2013.01); *H04W 72/0493* (2013.01)

(58) Field of Classification Search
None
See application file for complete search history.

(56) References Cited

U.S. PATENT DOCUMENTS

| 2014/0119266 A1* | 5/2014 | Ng ..................... H04L 27/2602 370/312 |
| 2014/0126490 A1* | 5/2014 | Chen .................... H04L 1/0067 370/328 |
| 2018/0042028 A1 | 2/2018 | Nam et al. |
| 2018/0083680 A1 | 3/2018 | Guo et al. |
| 2018/0287683 A1* | 10/2018 | Subramanian ....... H04B 7/0619 |

(Continued)

FOREIGN PATENT DOCUMENTS

| CN | 104770039 A | 7/2015 |
| CN | 105471559 A | 4/2016 |

(Continued)

OTHER PUBLICATIONS

Written Opinion and International Search Report in Application No. PCT/CN2019/080099 dated Oct. 15, 2020.

(Continued)

*Primary Examiner* — Sai Aung
(74) *Attorney, Agent, or Firm* — Maschoff Brennan

(57) ABSTRACT

A channel and signal transmission method and communication device are provided. The channel and signal transmission method applied to a communication device at a sending end includes: when transmitting at least two data transmission resources, send the data transmission resources, according to at least one of QCL information of the data transmission resources and a preset rule, where a data transmission resource includes at least one of a signal and a channel.

18 Claims, 2 Drawing Sheets when transmitting at least two data transmission resources, sending the data transmission resources, according to at least one of QCL information of the data transmission resources and a preset rule, where a data transmission resource includes at least one of a signal and a channel — 101 in a case that at least two data transmission resources are transmitted, receiving the data transmission resources, according to at least one of QCL information of the data transmission resources and a preset rule, where a data transmission resource includes at least one of a signal and a channel — 201

(56) References Cited

U.S. PATENT DOCUMENTS

| | | | |
|---|---|---|---|
| 2018/0323946 A1* | 11/2018 | Bendlin | .................. H04L 5/001 |
| 2019/0081759 A1* | 3/2019 | Wang | .................... H04L 5/0023 |
| 2019/0150187 A1* | 5/2019 | Park | ...................... H04W 72/14 |
| | | | 370/330 |
| 2019/0159209 A1 | 5/2019 | Xiao et al. | |
| 2021/0084623 A1 | 3/2021 | Zhang et al. | |
| 2021/0136733 A1* | 5/2021 | Miao | ..................... H04L 5/0048 |

FOREIGN PATENT DOCUMENTS

| | | |
|---|---|---|
| CN | 107342852 A | 11/2017 |
| WO | 2014129716 A1 | 8/2014 |
| WO | 2019161807 A1 | 8/2019 |

OTHER PUBLICATIONS

European Search Report dated May 10, 2021 as received as application No. 19782097.0.
Japanese Office Action dated Dec. 13, 2021 as received in application No. 2020-554151.
"Session Notes for Agenda Item 7.1 2" 3GPP TSG WG1 Meeting #92, R1-1803462, Feb. 26, 2018. Samsung.

\* cited by examiner when transmitting at least two data transmission resources, sending the data transmission resources, according to at least one of QCL information of the data transmission resources and a preset rule, where a data transmission resource includes at least one of a signal and a channel — 101

FIG.1 in a case that at least two data transmission resources are transmitted, receiving the data transmission resources, according to at least one of QCL information of the data transmission resources and a preset rule, where a data transmission resource includes at least one of a signal and a channel — 201

FIG.2

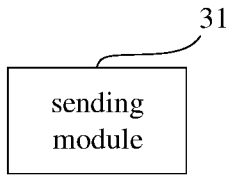

FIG.3

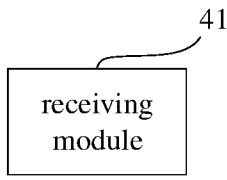

FIG.4

CHANNEL AND SIGNAL TRANSMISSION METHOD AND COMMUNICATION DEVICE

CROSS REFERENCE OF RELATED APPLICATION

The present application is a continuation application of PCT Application No. PCT/CN2019/080099 filed on Mar. 28, 2019, which claims a priority of Chinese patent application No. 201810301846.7 filed on Apr. 4, 2018, which is incorporated herein by reference in its entirety.

TECHNICAL FIELD

The present disclosure relates to the field of communications technology, and in particular to a channel and signal transmission method and a communication device.

BACKGROUND

The long term evolution (Long Term Evolution, LTE)/LTE-Advanced (LTE-A) and other wireless access technology standards are based on multiple-input multiple-output (Multiple-Input Multiple-Output, MIMO)+orthogonal frequency division multiplexing (Orthogonal Frequency Division Multiplexing, OFDM) technology. The MIMO technology uses the spatial freedom obtained by the multi-antenna system to improve the peak rate and system spectrum utilization.

In the process of standardization development, the dimensions of MIMO technology continue to expand. In LTE Rel-8, up to 4 layers of MIMO transmission can be supported. In the enhance multi-user multiple-input multiple-output (Multi-User Multiple-Input Multiple-Output, MU-MIMO) technology in Rel-9, the transmission mode (Transmission Mode, TM)-8 MU-MIMO (Multi-User MIMO) transmission can support up to 4 downlink data layers. In Rel-10, the single-user multiple-input multiple-output (Single-User MIMO, SU-MIMO) transmission capacity is extended to 8 data layers at most.

The industry is further advancing the MIMO technology towards three-dimensional (Three Dimensions, 3D) and large-scale. At present, the 3rd generation partnership project (3rd Generation Partnership Project, 3GPP) has completed the 3D channel modeling research project, and is carrying out the eFD-MIMO and New Radio (NR) MIMO research and standardization work. It is foreseeable that in the future 5G mobile communication system, the MIMO technology with a larger-scale and more antenna ports will be introduced.

Massive MIMO technology uses the large-scale antenna array, which can greatly improve the system frequency band utilization efficiency and support a larger number of access users. Therefore, major research organizations regard massive MIMO technology as one of the most potential physical layer technologies in the next generation of mobile communication systems.

In the massive MIMO technology, if an all-digital array is used, the maximized spatial resolution and optimal MU-MIMO performance can be achieved, but this structure requires a large number of digital-to-analog (DA)/analog-to-digital (AD) conversion devices and a large number of complete radio frequency-baseband processing channel, both equipment cost and baseband processing complexity will be a huge burden.

In order to avoid the aforementioned implementation cost and equipment complexity, the digital-analog hybrid beamforming technology came into being, that is, on the basis of the traditional digital domain beamforming, near the front end of the antenna system, an additional level of beamforming is added to the radio frequency signal. The analog beamforming can make the transmission signal and the channel achieve a relatively rough match in a relatively simple way. The dimension of the equivalent channel formed after analog beamforming is smaller than the actual number of antennas, so the subsequent required AD/DA conversion devices, the number of digital channels, and the corresponding baseband processing complexity can be greatly reduced. The residual interference of the analog beamforming part can be processed again in the digital domain to ensure the quality of MU-MIMO transmission. Compared with all-digital beamforming, the digital-analog hybrid beamforming is a compromise between performance and complexity, and has a higher practical prospect in systems with high frequency bands, large bandwidth or a large number of antennas.

In related art, at least two channels and signals are transmitted in the uplink or downlink. However, in high-frequency systems (communication systems in the frequency band above 6 GHz), the transmitter will determine the QCL information of these channels and signals according to related art, such as spatial-time-frequency parameters of the channel or signal indicated by TCI status, and the receiving end may perform a reception according to these parameters. There are no clear rules for judging whether at least two channels and signals can be multiplexed on the same symbol, and how to multiplex them on the same symbol, so it is possible that the base station and the terminal may inconsistently understand the relevant parameters of the transmitted channel or signal, resulting in an incorrect reception of the channel or signal.

SUMMARY

A channel and signal transmission method and a communication device are provided in the present disclosure.

In a first aspect, a channel and signal transmission method applied to a communication device at a sending end is provided in an embodiment of the present disclosure, including:

when transmitting at least two data transmission resources, sending the data transmission resources, according to at least one of quasi-colocation (QCL) information of the data transmission resources and a preset rule, where a data transmission resource includes at least one of a signal and a channel.

In a second aspect, a channel and signal transmission method applied to a communication device at a receiving end is provided in an embodiment of the present disclosure, including:

in a case that at least two data transmission resources are transmitted, receiving the data transmission resources, according to at least one of quasi-colocation (QCL) information of the data transmission resources and a preset rule, where a data transmission resource includes at least one of a signal and a channel.

In a third aspect, a communication device applied to a sending end is provided in an embodiment of the present disclosure, including:

a sending module, configured to, when transmitting at least two data transmission resources, send the data transmission resources, according to at least one of quasi-colocation (QCL) information of the data transmission resources and a preset rule, where a data transmission resource includes at least one of a signal and a channel.

In a fourth aspect, a communication device applied to a receiving end is provided in an embodiment of the present disclosure, including:

a receiving module, configured to, in a case that at least two data transmission resources are transmitted, receive the data transmission resources, according to at least one of quasi-colocation (QCL) information of the data transmission resources and a preset rule, where a data transmission resource includes at least one of a signal and a channel.

In a fifth aspect, a communication device is provided in an embodiment of the present disclosure, including: a memory, a processor and a computer program stored in the memory and executable on the processor, where the processor executes the computer program to perform the channel and signal transmission method hereinabove.

In a sixth aspect, a computer-readable storage medium is provided in an embodiment of the present disclosure, where a computer program is stored in the computer-readable storage medium, and a processor executes the computer program to perform the channel and signal transmission method hereinabove.

The embodiments of the present disclosure have the following beneficial effects:

In the above embodiments, when there are at least two channels and signals to be transmitted, the channels and signals are transmitted according to at least one of QCL information of the channels and signals and a preset rule. According to the embodiments of the present disclosure, it is able to achieve a correct transmission of the channel and signal.

BRIEF DESCRIPTION OF THE DRAWINGS

In order to explain the technical solutions of the embodiments of the present disclosure more clearly, the following will briefly introduce the drawings that need to be used in the description of the embodiments of the present disclosure. Obviously, the drawings in the following description are only some embodiments of the present disclosure. For those of ordinary skill in the art, other drawings may be obtained based on these drawings without creative work.

FIG. 1 is a schematic diagram of a channel and signal transmission method at a sending end in an embodiment of the disclosure;

FIG. 2 is a schematic diagram of a channel and signal transmission method at a receiving end in an embodiment of the disclosure;

FIG. 3 is a schematic structural diagram of a communication device at a sending end in an embodiment of the disclosure;

FIG. 4 is a schematic structural diagram of a communication device at a receiving end in an embodiment of the disclosure;

DETAILED DESCRIPTION

Figure 5:
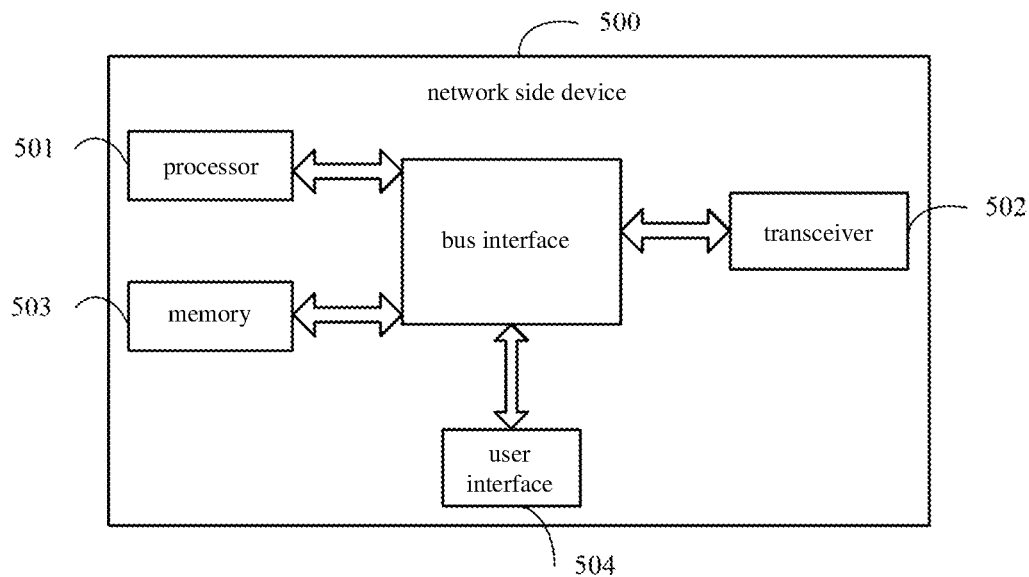
FIG. 5 is a schematic diagram of a composition of a network side device in an embodiment of the disclosure.

Hereinafter, exemplary embodiments of the present disclosure will be described in more detail with reference to the drawings. Although exemplary embodiments of the present disclosure are shown in the drawings, it should be understood that the present disclosure can be implemented in various forms and should not be limited by the embodiments set forth herein. On the contrary, these embodiments are provided to enable a more thorough understanding of the present disclosure and to fully convey the scope of the present disclosure to those skilled in the art.

The terms "first", "second" in the specification and claims of the present disclosure are used to distinguish similar objects, and are not necessarily used to describe a specific sequence or sequence. It should be understood that the data used in this way can be interchanged under appropriate circumstances, so that the embodiments of the present application described herein can be implemented in a sequence other than those illustrated or described herein, for example. In addition, the terms "including" and "having" and any variations of them are intended to cover non-exclusive inclusions. For example, a process, method, system, product, or device that includes a series of steps or units is not necessarily limited to the clearly listed steps or units, but may include other steps or units that are not clearly listed or are inherent to these processes, products, or equipment.

In the study of next-generation communication systems after 4G, the working frequency band supported by the system is increased to above 6 GHz, up to about 100 GHz. The high frequency band has relatively abundant idle frequency resources, which can provide greater throughput for data transmission. At present, 3GPP has completed the high-frequency channel modeling work. The wavelength of the high-frequency signal is short. Compared with the low frequency band, more antenna elements can be arranged on the panel of the same size, and the beamforming technology is used to form beam with a stronger directivity and a narrower lobe. Therefore, combining large-scale antennas with high-frequency communications is also one of the future trends.

Regarding beam measurement and reporting (beam measurement and beam reporting), analog beamforming is a full-bandwidth transmission, and each polarization direction element on the panel of each high-frequency antenna array can only transmit the analog beam in a time-division multiplexing manner. The beamforming weight of the analog beam is realized by adjusting the parameters of the RF front-end phase shifter and other equipment.

At present, in academia and industry, the training of analog beamforming vectors is usually carried out by polling, that is, the array element of each polarization direction of each antenna panel sends the training signal (that is, the candidate shaping vector) in turn at the appointed time in a time-division multiplexing manner, the terminal feeds back the beam report after a measuring the training signal, so that the network side may use the training signal to implement the analog beam transmission during the next service transmission. The content of the beam report usually includes several optimal transmit beam identifiers and the measured received power of each transmit beam.

Regarding the beam indication mechanism, in related art, the network side device configures correspondence between state and reference signal (Reference Signal, RS) and the transmission configuration indication (Transmission Configuration Indication, TCI) for the user equipment (User Equipment, UE) through a radio resource control (Radio Resource Control, RRC) signaling.

When TCI is used for the Quasi-colocation (QCL) indication of the Physical Downlink Control Channel (PDCCH), the network side device configures K TCI states (states) for each CORESET, when K>1 at this time, a media access control (Media Access Control, MAC) control element (CE)

indicates one TCI state. When K=1, no additional MAC CE signaling is required. When the UE monitors the CORESET, it uses the same TCI state for all search spaces in the CORESET. The RS resource in the RS set corresponding to the TCI state (for example, periodic channel state information reference signal (CSI reference signal, CSI-RS) resource, semi-persistent CSI-RS resource, SS block, etc.) and UE-specific PDCCH demodulation reference signal (Demodulation Reference Signal, DMRS) port is spatial QCL. The UE may learn which receiving beam to use to receive the PDCCH according to the TCI state.

When TCI is used for PDSCH QCL indication, the network activates $2^N$ TCI states, and then uses the N-bit TCI field of Downlink Control Information (DCI) to notify the TCI state. The RS resource in the RS set corresponding to the TCI state and the DMRS port of the physical downlink shared channel (Physical Downlink Shared Channel, PDSCH) to be scheduled are QCL. The UE may learn which receiving beam to use to receive the PDSCH according to the TCI state. For the presence or absence of TCI field in DCI, when scheduling offset <=k (scheduling offset refers to the time interval from when DCI is received to when DCI becomes valid), the QCL of PDSCH uses the default TCI state, where the default TCI state is the TCI state of the CORESET with the smallest ID in the slot.

For the initial TCI states of the PDCCH and PDSCH, between the initial RRC configuration and the MAC CE-activated TCI states, the PDCCH DMRS and PDSCH DMRS and the initial access determined synchronization signal block (Synchronization Signal Block, SSB) are spatial QCL.

When TCI is used for QCL indication of Physical Uplink Control Channel (PUCCH), a RRC signaling is used for PUCCH beam indication. The RRC parameter used is the physical uplink control channel spatial relationship information (PUCCH-Spatial-relation-info). The RRC configuration is per PUCCH resource, and the configured PUCCH beam information is related to the SSB ID or CSI-RS resource indicator (CSI) or SRS Resource Indicator (SRI). When the PUCCH-Spatial-relation-info contains multiple entries, the MAC-CE is used to indicate the spatial relationship information (spatial relation information) between the PUCCH resource and one entry of the PUCCH-Spatial-relation-info. When the PUCCH-Spatial-relation-info includes only one Spatial Relation Info IE, the UE applies the configured Spatial Relation Info and does not need to use MAC-CE.

When TCI is used for CSI-RS QCL indication, the source RS and target RS can be: SSB→periodic CSI-RS (Periodic CSI-RS, P-CSI-RS)/semi-persistent CSI-RS (Semi-Persistent CSI-RS, SP-CSI-RS), P-CSI-RS→P-CSI-RS, SSB/P-CSI-RS/SP-CSI-RS→aperiodic CSI-RS (Aperiodic CSI-RS) RS, AP-CSI-RS). There is no QCL between the two CSI-RSs by default. The SP-CSI-RS is configured by RRC SP-CSI-RS resource(s), and activated/deactivated by MAC-CE. When the MAC-CE activates the SP-CSI-RS, it also indicates the QCL of SP-CSI-RS. For AP-CSI-RS, the RRC configures the QCL of AP-CSI-RS resource and uses DCI to trigger AP-CSI-RS.

When TCI is used for the QCL indication of sounding reference signal (Sounding Reference Signal, SRS), the QCL is indicated by an SRS resource or Downlink (DL) RS, and the DL RS includes at least CSI-RS and SSB. When the target RS is P-SRS, the target RS is configured by a RRC signaling. When the target RS is SP-SRS, the target RS is indicated by the RRC+MAC-CE. When the target RS is AP-SRS, the target RS is configured by the RRC or RRC+MAC-CE and indicated by the DCI.

At least two channels and signals are transmitted in the uplink or downlink. However, in high-frequency systems (communication systems in the frequency band above 6 GHz), the transmitter will determine the QCL information of these channels and signals according to related art, such as spatial-time-frequency parameters of the channel or signal indicated by TCI status, and the receiving end may perform a reception according to these parameters. There are no clear rules for judging whether at least two channels and signals can be multiplexed on the same symbol, and how to multiplex them on the same symbol, so it is possible that the base station and the terminal may inconsistently understand the relevant parameters of the transmitted channel or signal, resulting in an incorrect reception of the channel or signal.

In view of the above issues, a channel and signal transmission method and a communication device are provide in the embodiments of the present disclosure, which can make the communication device at the sending end and the receiving end have consistent understanding of the relevant parameters of the channel and signal to be transmitted, thereby realizing the correct transmission of the channel and signal.

A channel and signal transmission method applied to a communication device at a sending end is provided in the embodiments of the present disclosure. As shown in FIG. 1, the method includes:

Step 101: when transmitting at least two data transmission resources, sending the data transmission resources, according to at least one of quasi-colocation (QCL) information of the data transmission resources and a preset rule, where a data transmission resource includes at least one of a signal and a channel.

In this embodiment, when there are at least two channels and signals to be transmitted, the channel and signal are transmitted according to at least one of the QCL information of the channel and the signal and the preset rule. According to the embodiment of the present disclosure, it is able to can make the communication devices at the sending end and the receiving end to consistently understand the relevant parameters of the channel and signal to be transmitted, such as determining whether multiple channels and signals can be multiplexed on the same symbol to be transmitted simultaneously, as well as the QCL information used, so as to achieve the correct transmission of channels and signals.

The signal includes a reference signal (reference signal, RS).

Further, the QCL information includes QCL information of type A, type B, and type C, and the method specifically includes:

sending the corresponding data transmission resource using respective QCL information of the at least two data transmission resources.

Further, the QCL information includes QCL information of type D, and the transmission method specifically includes:

determining whether the at least two data transmission resources are capable of being multiplexed to be transmitted in a same symbol;

in a case that the at least two data transmission resources are capable of being multiplexed to be transmitted in the same symbol, determining the QCL information of the data transmission resources, and sending the corresponding data transmission resource on the same symbol through the determined QCL information;

in a case that the at least two data transmission resources are not capable of being multiplexed to be transmitted in the same symbol, sending the corresponding data transmission resource using respective QCL information of the at least two data transmission resources, or determining priorities of the at least two data transmission resources and sending the data transmission resource with a highest priority.

When the channel and signal to be transmitted are multiplexed on the same symbol, and the same spatial QCL information is configured and indicated, the same spatial QCL information can be used to transmit the channel and signal. The multiplexing mode may be frequency-division multiplexing (Frequency-division multiplexing, FDM).

When the channel and signal to be transmitted are multiplexed on the same symbol, but different spatial QCL information is configured and indicated, the channel or signal with low priority uses the spatial QCL information of the channel or signal with high priority and multiplexed on the same symbol for transmission, or only a channel or signal with a high priority is transmitted, but a channel or signal with a low priority is not transmitted.

When the channels and signals to be transmitted cannot be multiplexed on the same symbol, these channels and channels use their respective configurations and indicated spatial QCL information for transmission. In addition, the sending end may only send channels or signals with high priority, and does not send channels or signals with low priority.

Further, the determining the QCL information of the data transmission resources and sending the corresponding data transmission resource on the same symbol through the determined QCL information in the case that the at least two data transmission resources are capable of being multiplexed to be transmitted in the same symbol includes:

in a case that the at least two data transmission resources have same QCL information, sending the at least two data transmission resources through the same QCL information; or in a case that the at least two data transmission resources have different QCL information, sending the at least two data transmission resources through the QCL information of the data transmission resource with the highest priority, or sending the data transmission resource with the highest priority.

Further, the priorities of the data transmission resources are determined according to at least one of:

method A: for the at least two data transmission resources, the priority of the data transmission resource for which the QCL information configured or indicated by a network side device is valid is higher than the priority of the data transmission resource for which the QCL information configured or indicated by the network side device is invalid, and the data transmission resource for which the QCL information configured or indicated by the network side device is invalid needs to use the default QCL information;

method B: for the at least two data transmission resources, the priority of the data transmission resource for aperiodic transmission is higher than the priority of the data transmission resource for periodic transmission;

method C: for at least two data transmission resources for aperiodic transmission, the priority of the data transmission resource for which the QCL information configured or indicated by the network side device becomes valid latest is the highest;

method D: for the data transmission resources for periodic transmission of different cells, the priority of the data transmission resource for a primary serving cell (PCell) is higher than the priority of the data transmission resource for a secondary serving cell (SCell);

method E: for the at least two data transmission resources, a priority of a physical downlink control channel (PDCCH) is higher than a priority of a physical downlink shared channel (PDSCH), and the priority of the PDSCH is higher than a priority of a channel state information reference signal (CSI-RS);

method F: for the at least two data transmission resources, a priority of a physical uplink shared channel (PUSCH) is higher than a priority of a physical uplink control channel (PUCCH), and the priority of the PUCCH is higher than a priority of a sounding reference signal (SRS).

Further, the transmission method further includes: determining priorities of the data transmission resources by using at least two methods of the methods A to F in a preset order.

Further, after the priorities of the data transmission resources are determined by using a first method of the at least two methods in the preset order and at least two data transmission resources have a same priority, the priorities of the at least two data transmission resources are determined by using the other methods of the at least two methods.

Further, after the priorities of the data transmission resources are determined by using at least two methods of the methods A to F and at least two data transmission resources have the same priority, the priorities of the at least two data transmission resources are set.

When at least two channels and signals need to be transmitted, the above multiple priority determining methods can be used to determine the priority. If the multiple priority determining methods are used, the order of the using of the selected multiple priority determining methods may be arbitrarily arranged to determine the channel and signal transmission method, that is, determining whether being multiplexed on the same symbol for transmission, and the used QCL information.

For example, when the priority determining method A and priority determining method B are selected, the priority of multiple channels and signals to be transmitted can be determined according to the priority determining method A. Then, the priorities of multiple channels and signals that cannot be determined according to the priority determining method A will be determined according to the priority determining method B. If there are channels or signals having the same priority after all the priority determining methods are used, the priorities thereof may be determined randomly, until all the priorities thereof are determined.

Further, the data transmission resources for periodic transmission includes at least one of: a synchronization signal block (SSB), a periodic CSI-RS, a semi-persistent CSI-RS, a periodic SRS, a semi-persistent SRS, a PDCCH, a PUCCH, a semi-static scheduling PDSCH, a semi-static scheduling PUSCH.

The data transmission resources for aperiodic transmission includes at least one of: an aperiodic CSI-RS, an aperiodic SRS, a dynamical scheduling PDSCH and a dynamical scheduling PUSCH.

Further, at least two channels and signals are multiplexed and transmitted on the same symbol, the communication device at the sending end transmits only one beam at one time point.

Further, in the case that the data transmission resources are applied to a downlink, the at least two data transmission resources include at least one combination of:

an SSB and a PDSCH;
a CSI-RS and a PDSCH;
a PDCCH and a PDSCH;

a CSI-RS and a PDCCH;
a CSI-RS and an SSB;
a PDCCH and a PDCCH;
a CSI-RS and a CSI-RS;
a PDSCH and a PDSCH;
a reference signal (RS) for a radio resource management (RRM) and other channels or signals;
in a case that the data transmission resource is applied to an uplink, the data transmission resources includes at least one combination of:
a PUCCH and a PUCCH;
a PUSCH and a PUSCH;
an SRS and an SRS.

When the data transmission resource is applied to the downlink, the sending end is a network side device; when the data transmission resource is applied to the uplink, the sending end is a user equipment.

A channel and signal transmission method applied to a communication device at a receiving end is provided in an embodiment of the present disclosure. As shown in FIG. 2, the method includes:

Step 201: in a case that at least two data transmission resources are transmitted, receiving the data transmission resources, according to at least one of quasi-colocation (QCL) information of the data transmission resources and a preset rule, where a data transmission resource includes at least one of a signal and a channel.

In this embodiment, when there are at least two channels and signals to be transmitted, the channel and signal are transmitted according to at least one of the QCL information of the channel and the signal and the preset rule. According to the embodiment of the present disclosure, it is able to can make the communication devices at the sending end and the receiving end to consistently understand the relevant parameters of the channel and signal to be transmitted, such as determining whether multiple channels and signals can be multiplexed on the same symbol to be transmitted simultaneously, as well as the QCL information used, so as to achieve the correct transmission of channels and signals.

Further, the signal includes a reference signal (RS).

Further, where the QCL information includes QCL information of type A, type B and type C, and the method further includes:
receiving the corresponding data transmission resource using respective QCL information of the at least two data transmission resources.

Further, where the QCL information includes QCL information of type D, and the method further includes:
determining whether the at least two data transmission resources are capable of being multiplexed to be transmitted in a same symbol;
in a case that the at least two data transmission resources are capable of being multiplexed to be transmitted in the same symbol, determining the QCL information of the data transmission resources, and receiving the corresponding data transmission resource on the same symbol through the determined QCL information;
in a case that the at least two data transmission resources are not capable of being multiplexed to be transmitted in the same symbol, receiving the corresponding data transmission resource using respective QCL information of the at least two data transmission resources, or determining priorities of the at least two data transmission resources and receiving the data transmission resource with a highest priority.

When the channel and signal to be transmitted are multiplexed on the same symbol, and the same spatial QCL information is configured and indicated, the same spatial QCL information can be used to transmit the channel and signal. The multiplexing mode may be FDM.

When the channel and signal to be transmitted are multiplexed on the same symbol, but different spatial QCL information is configured and indicated, the channel or signal with low priority uses the spatial QCL information of the channel or signal with high priority and multiplexed on the same symbol for transmission, or only a channel or signal with a high priority is transmitted, but a channel or signal with a low priority is not transmitted.

When the channels and signals to be transmitted cannot be multiplexed on the same symbol, these channels and channels use their respective configurations and indicated spatial QCL information for transmission. In addition, the receiving end may only receive channels or signals with high priority, and does not receive channels or signals with low priority.

Further, the determining the QCL information of the data transmission resources and receiving the corresponding data transmission resource on the same symbol through the determined QCL information in the case that the at least two data transmission resources are capable of being multiplexed to be transmitted in the same symbol includes:
in a case that the at least two data transmission resources have same QCL information, receiving the at least two data transmission resources through the same QCL information; or
in a case that the at least two data transmission resources have different QCL information, receiving the at least two data transmission resources through the QCL information of the data transmission resource with the highest priority, or receiving the data transmission resource with the highest priority.

Further, the priorities of the data transmission resources are determined according to at least one of:
method A: for the at least two data transmission resources, the priority of the data transmission resource for which the QCL information configured or indicated by a network side device is valid is higher than the priority of the data transmission resource for which the QCL information configured or indicated by the network side device is invalid;
method B: for the at least two data transmission resources, the priority of the data transmission resource for aperiodic transmission is higher than the priority of the data transmission resource for periodic transmission;
method C: for at least two data transmission resources for aperiodic transmission, the priority of the data transmission resource for which the QCL information configured or indicated by the network side device becomes valid latest is the highest;
method D: for the data transmission resources for periodic transmission of different cells, the priority of the data transmission resource for a primary serving cell (PCell) is higher than the priority of the data transmission resource for a secondary serving cell (SCell);
method E: for the at least two data transmission resources, a priority of a physical downlink control channel (PDCCH) is higher than a priority of a physical downlink shared channel (PDSCH), and the priority of the PDSCH is higher than a priority of a channel state information reference signal (CSI-RS);
method F: for the at least two data transmission resources, a priority of a physical uplink shared channel (PUSCH) is higher than a priority of a physical uplink control channel (PUCCH), and the priority of the PUCCH is higher than a priority of a sounding reference signal (SRS).

Further, the priorities of the data transmission resources are determined by using at least two methods of the methods A to F in a preset order.

Further, in a case that the priorities of the data transmission resources are determined by using a first method of the at least two methods in the preset order and at least two data transmission resources have a same priority, the priorities of the at least two data transmission resources are determined by using the other methods of the at least two methods.

Further, in a case that the priorities of the data transmission resources are determined by using at least two methods of the methods A to F and at least two data transmission resources have the same priority, the priorities of the at least two data transmission resources are set.

When at least two channels and signals need to be transmitted, the above multiple priority determining methods can be used to determine the priority. If the multiple priority determining methods are used, the order of the using of the selected multiple priority determining methods may be arbitrarily arranged to determine the channel and signal transmission method, that is, determining whether being multiplexed on the same symbol for transmission, and the used QCL information.

For example, when the priority determining method A and priority determining method B are selected, the priority of multiple channels and signals to be transmitted can be determined according to the priority determining method A. Then, the priorities of multiple channels and signals that cannot be determined according to the priority determining method A will be determined according to the priority determining method B. If there are channels or signals having the same priority after all the priority determining methods are used, the priorities thereof may be determined randomly, until all the priorities thereof are determined.

Further, the data transmission resources for periodic transmission includes at least one of: a synchronization signal block (SSB), a periodic CSI-RS, a semi-persistent CSI-RS, a periodic SRS, a semi-persistent SRS, a PDCCH, a PUCCH, a semi-static scheduling PDSCH, a semi-static scheduling PUSCH;

the data transmission resource for aperiodic transmission includes at least one of: an aperiodic CSI-RS, an aperiodic SRS, a dynamical scheduling PDSCH and a dynamical scheduling PUSCH.

Further, a multiplexing mode is a frequency division multiplexing.

Further, the communication device at the sending end receives one beam at one time point.

Further, in the case that the data transmission resources are applied to a downlink, the at least two data transmission resources include at least one combination of:
an SSB and a PDSCH;
a CSI-RS and a PDSCH;
a PDCCH and a PDSCH;
a CSI-RS and a PDCCH;
a CSI-RS and an SSB;
a PDCCH and a PDCCH;
a CSI-RS and a CSI-RS;
a PDSCH and a PDSCH;
a reference signal (RS) for a radio resource management (RRM) and other channels or signals;
in a case that the data transmission resource is applied to an uplink, the data transmission resources includes at least one combination of:
a PUCCH and a PUCCH;
a PUSCH and a PUSCH;
an SRS and an SRS.

When the data transmission resource is applied to the downlink, the receiving end is a user equipment; when the data transmission resource is applied to the uplink, the receiving end is a network side device.

The following describes in detail the channel and signal transmission method of the present disclosure in conjunction with embodiments.

In this embodiment, it is specified in the downlink whether different channels and signals on the same carrier (Component Carrier, CC) or the same bandwidth part (Band with Part, BWP) can be multiplexed on the same symbol, and the used QCL information.

| channels or signals in the same OFDM symbol | same CC carrier or same BWP |
|---|---|
| SSB + PDSCH | (1) QCL information for QCL type A, QCL type B, QCL type C<br>  a) when scheduling offset (i.e. the time interval between receiving DCI and receiving PDSCH scheduled by the DCI) is less than a preset threshold (which may be agreed by protocol or configured by network side devices),<br>    i. the PDSCH uses the QCL information indicated by the default TCI status (i.e. the corresponding type of QCL information indicated by the TCI status of the QCL information for PDCCH on the CORESET indicating a preset ID.<br>  b) when the scheduling offset is greater than or equal to a preset threshold,<br>    i. the PDSCH uses the corresponding type of QCL information indicated by the TCI state in the DCI for scheduling the PDSCH.<br>(2) For QCL information (spatial reception parameters) of QCL type D,<br>  a) the network side device may configure and indicate that the SSB and PDSCH are on the same symbol (multiplexed by FDM manner) and are spatial QCL,<br>  b) when the SSB and PDSCH are not spatial QCL,<br>    i. if the SSB is associated with CORESET 0, or with any other CORESET, or the best SSB measured by the UE during initial access, or the SSB indicated by the TCI state activated by the MAC CE, or the SSB associated with CSI-RS resources, |

-continued

| channels or signals in the same OFDM symbol | same CC carrier or same BWP |
|---|---|
| | 1. the UE receives the SSB and does not receive PDSCH; or<br>2. the UE receives PDSCH without SSB; or<br>3. the PDSCH uses the same spatial QCL information as the SSB.<br>  ii. If the scheduling offset is not the SSB in the i,<br>    1. the UE receives the PDSCH, and when the scheduling offset is smaller than a preset threshold, the PDSCH uses spatial QCL information indicated by a default TCI state; and when the scheduling offset is greater than or equal to a preset threshold, the PDSCH uses the corresponding type of spatial QCL information indicated by the TCI state in the DCI for scheduling the PDSCH. |
| CSI-RS + PDSCH | (1) For QCL information of QCL type A, QCL type B and QCL type C, when scheduling offset is smaller than a preset threshold, the PDSCH uses QCL information indicated by a default TCI state; and when the scheduling offset is greater than or equal to a preset threshold, the PDSCH uses the corresponding type of QCL information indicated by the TCI state in the DCI for scheduling the PDSCH.<br>(2) For the QCL information (spatial receiving parameter) of QCL type D<br>  a) when a CSI-RS for beam management and a CSI-RS-ResourceRep parameter of a network configured with a CSI-RS resource set are ON, the CSI-RS and a PDSCH are not multiplexed ON the same symbol for transmission;<br>  i. if the CSI-RS is a periodic or semi-continuous CSI-RS,<br>    1. when the scheduling offset of the PDSCH is smaller than a preset threshold, the UE receives the CSI-RS by using the spatial QCL information of the CSI-RS.<br>    2. when the scheduling offset of the PDSCH is greater than or equal to the preset threshold, the UE receives the PDSCH by using the spatial QCL information of the PDSCH indicated by the TCI state in the DCI, but does not receive the CSI-RS. The PDSCH may then be rate matched.<br>  ii. If the CSI-RS is the aperiodic CSI-RS and the scheduling offset of the aperiodic CSI-RS is allowed to be smaller than a preset threshold, transmitting the CSI-RS;<br>    1. when the scheduling offsets of the two are smaller than respective preset thresholds, the aperiodic CSI-RS uses the spatial QCL information indicated by the default TCI state of the PDSCH.<br>    2. when the scheduling offset of the UE and the PDSCH is greater than or equal to the respective preset threshold, the UE receives the PDSCH by using the spatial QCL information of the PDSCH indicated by the TCI state in the DCI, but does not receive the aperiodic CSI-RS. The PDSCH may or may not be rate matched at this time.<br>    3. when the scheduling offset of one of the channel or the signal is smaller than the preset threshold and the scheduling offset of the other one is larger than or equal to the preset threshold, using the spatial QCL information of the channel or the signal of which the scheduling offset is larger than or equal to the preset threshold for the channel or the signal of which the scheduling offset is smaller than or equal to the preset threshold.<br>  iii. If the CSI-RS is the aperiodic CSI-RS and the CSI-RS is not allowed to be transmitted when the scheduling offset of the aperiodic CSI-RS smaller than a preset threshold<br>    1. when the scheduling offset of the UE and the PDSCH is smaller than the respective preset threshold, only the PDSCH is transmitted, and the UE receives the PDSCH by using the spatial QCL information indicated by the default TCI state of the PDSCH.<br>    2. when the scheduling offset of the UE and the PDSCH is greater than or equal to the respective preset threshold, the UE receives the PDSCH by using the spatial QCL information of the PDSCH indicated by the TCI state in the DCI, but does not receive the aperiodic CSI-RS. The PDSCH may or may not be rate matched at this time.<br>    3. when the scheduling offset of the aperiodic CSI-RS is smaller than a preset threshold and the scheduling offset of the PDSCH is larger than or equal to the preset threshold, |

| channels or signals in the same OFDM symbol | same CC carrier or same BWP |
|---|---|
| | only the PDSCH is transmitted, and the UE receives the PDSCH by using spatial QCL information indicated by the TCI state in the DCI. |

4. when the scheduling offset of the aperiodic CSI-RS is greater than or equal to a preset threshold and the scheduling offset of the PDSCH is smaller than the preset threshold, the PDSCH uses the spatial QCL information of the aperiodic CSI-RS.
b) For CSI-RS used for beam management, and the parameter of CSI-RS-ResourceRep of CSI-RS resource set configured by a network is off,
i. if the CSI-RS is a periodic or semi-continuous CSI-RS
1. when the scheduling offset of PDSCH is smaller than a preset threshold, the PDSCH and the CSI-RS can be multiplexed on the same symbol,
2. when the scheduling offset of PDSCH is larger than or equal to the preset threshold,
a) if the CSI-RS and the PDSCH are spatial QCL, the PDSCH and the CSI-RS can be multiplexed on the same symbol, and the UE uses the spatial QCL information of the PDSCH and the CSI-RS to receive the PDSCH.
b) if the CSI-RS and the PDSCH are not spatial QCL, the UE receives the PDSCH using spatial QCL information of a TCI status indication in the DCI without receiving the CSI-RS.
ii. If the CSI-RS is an aperiodic CSI-RS and the transmission of CSI-RS is allowed when the scheduling offset of the aperiodic CSI-RS is smaller than a preset threshold,
1. the aperiodic CSI-RS uses the spatial QCL information indicated by the default TCI state of the PDSCH when both of the scheduling offsets are smaller than the respective preset thresholds
2. when both of the scheduling offsets are greater than or equal to the respective preset thresholds, both of them may be multiplexed on the same symbol and have the same spatial QCL information. If the spatial QCL information of the two are different, the UE receives the PDSCH by using the spatial QCL information of the PDSCH indicated by the TCI state in the DCI, but does not receive the aperiodic CSI-RS. The PDSCH may or may not be rate matched at this time
3. when the scheduling offset of one of the channel or the signal is smaller than the preset threshold and the scheduling offset of the other one is larger than or equal to the preset threshold, using the spatial QCL information of the channel or the signal of which the scheduling offset is larger than or equal to the preset threshold for the channel or the signal of which the scheduling offset is smaller than or equal to the preset threshold
iii. if the CSI-RS is the aperiodic CSI-RS and the transmission of CSI-RS is not allowed when the scheduling offset of the aperiodic CSI-RS is smaller than the preset threshold,
1. only the PDSCH is transmitted when the scheduling offset of the CSI-RS and the scheduling offset of the aperiodic CSI-RS are both smaller than the respective preset threshold, and the UE receives the PDSCH by using the spatial QCL information indicated by the default TCI state of the PDSCH.
2. when the scheduling offsets of both are greater than or equal to the respective preset thresholds, both may be multiplexed on the same symbol and have the same spatial QCL information. And if the spatial QCL information of the two is different, the UE receives the PDSCH by using the spatial QCL information of the PDSCH indicated by the TCI state in the DCI, but does not receive the aperiodic CSI-RS. The PDSCH may or may not be rate matched at this time.
3. when the scheduling offset of the aperiodic CSI-RS is smaller than a preset threshold and the scheduling offset of the PDSCH is larger than or equal to the preset threshold, only the PDSCH is transmitted, and the UE receives the PDSCH by using spatial QCL information indicated by the TCI state in the DCI.

| channels or signals in the same OFDM symbol | same CC carrier or same BWP |
|---|---|
| | 4. when the scheduling offset of the aperiodic CSI-RS is greater than or equal to a preset threshold and the scheduling offset of the PDSCH is smaller than the preset threshold, the PDSCH uses the spatial QCL information of the aperiodic CSI-RS.<br>c) for CSI-RS (such as NZP-CSI-RS, CSI-IM) used for channel measurement and interference measurement, similar (2) b,<br>d) for CSI-RS used for time-frequency tracking (or called TRS),<br>i. when a scheduling offset of the PDSCH is smaller than a preset threshold, multiplexing the CSI-RS and the PDSCH on the same symbol, where the two are spatially QCLs,<br>ii. when the scheduling offset of the PDSCH is greater than or equal to the preset threshold,<br>1. multiplexing the PDSCH on the same symbol, where the two are spatially QCLs, using spatial QCL information of the TRS.<br>2. multiplexing both on the same symbol and not spatial QCL, the UE receives PDSCH but not TRS. |
| PDCCH/CORESET + PDSCH | (1) For QCL information of QCL type A, QCL type B and QCL type C, when scheduling offset is smaller than a preset threshold, the PDSCH uses QCL information indicated by a default TCI state; and when the scheduling offset is greater than or equal to a preset threshold, the PDSCH uses the corresponding type of QCL information indicated by the TCI state in the DCI for scheduling the PDSCH.<br>(2) For QCL information (spatial reception parameters) of QCL type D,<br>    a) when the scheduling offset of the PDSCH is smaller than the preset threshold, the PDSCH and the PDSCH can be multiplexed on the same symbol, and the PDSCH are spatial QCL, and the PDSCH uses the spatial QCL information of PDCCH/CORESET.<br>    b) when the scheduling offset of the PDSCH is greater than or equal to the preset threshold,<br>    i. the PDSCH is not scheduled on the same symbol as the PDCCH/CORESET through the DCI, or<br>    ii. both may be multiplexed on the same symbol and both are spatial QCL, the PDSCH using the PDCCH/core set spatial QCL information, or<br>    iii. both are multiplexed on the same symbol and are not spatially QCL, the UE receives PDCCH/core set but not PDSCH. |
| CSI-RS + PDCCH/CORESET | (1) For QCL information (spatial reception parameters) of QCL type D versus CSI-RS used for beam management, and when the CSI-RS-ResourceRep parameter for which the network is configured with CSI-RS resource set is ON,<br>i. if the CSI-RS is periodic or semi-continuous CSI-RS<br>1. CSI-RS and PDCCH/CORESET are not multiplexed for transmission ON the same symbol.<br>ii. if the CSI-RS is the aperiodic CSI-RS and the transmission of CSI-RS is allowed when the scheduling offset of the aperiodic CSI-RS is smaller than the preset threshold,<br>1. the CSI-RS and the PDCCH/CORESET are not multiplexed to be transmitted on the same symbol when the scheduling offset of the aperiodic CSI-RS is smaller than the preset threshold.<br>2. the scheduling offset of the aperiodic CSI-RS is larger than or equal to a preset threshold, if the scheduling offset of the aperiodic CSI-RS and the aperiodic CSI-RS is spatial QCL, the UE receives the aperiodic CSI-RS and the spatial QCL by using PDCCH/CORESET; if both are not spatially QCL, the UE receives the aperiodic CSI-RS and does not receive PDCCH/CORESET.<br>iii. if the CSI-RS is the aperiodic CSI-RS and the transmission of CSI-RS is not allowed when the scheduling offset of the aperiodic CSI-RS is smaller than the preset threshold,<br>1. only PDCCH/CORESET is provided when the scheduling offset of the aperiodic CSI-RS is smaller than the preset threshold.<br>2. when the scheduling offset of the aperiodic CSI-RS is larger than or equal to a preset threshold, if the scheduling offset of the aperiodic CSI-RS and the aperiodic CSI-RS is spatial QCL, the UE receives the aperiodic CSI-RS and the spatial QCL by using |

| channels or signals in the same OFDM symbol | same CC carrier or same BWP |
|---|---|
| | PDCCH/CORESET; if they are not spatially QCL, the UE receives the aperiodic CSI-RS and does not receive PDCCH/CORESET.<br>b) For CSI-RS used for beam management, and when a CSI-RS-ResourceRep parameter with CSI-RS resource set configured by the network is OFF,<br>i. if the CSI-RS is a periodic or semi-continuous CSI-RS,<br>1. the CSI-RS and PDCCH/CORESET can be multiplexed on the same symbol, and the UE receives the CSI-RS and the PDCCH/CORESET by using the spatial QCL information of PDCCH/CORESET<br>ii. if the CSI-RS is the aperiodic CSI-RS and the scheduling offset of the aperiodic CSI-RS is allowed to be smaller than the preset threshold,<br>1. when the scheduling offset of the aperiodic CSI-RS is smaller than the preset threshold, the CSI-RS and the PDCCH/CORESET can be multiplexed on the same symbol, and the UE receives the CSI-RS and PDCCH/CORESET by using the spatial QCL information of PDCCH/CORESET.<br>2. when the scheduling offset of the aperiodic CSI-RS is greater than or equal to a preset threshold,<br>a) the CSI-RS and PDCCH/CORESET can be multiplexed on the same symbol, and the UE receives the CSI-RS and PDCCH/CORESET by using the spatial QCL information of the PDCCH/CORESET.<br>b) if they are multiplexed on the same symbol, but not spatial QCL, the UE receives the aperiodic CSI-RS and not the PDCCH/CORESET.<br>iii. if the CSI-RS is the aperiodic CSI-RS and the transmission of CSI-RS is not allowed when the scheduling offset of the aperiodic CSI-RS is smaller than the preset threshold,<br>1. only PDCCH/CORESET is provided when the scheduling offset of the aperiodic CSI-RS is smaller than the preset threshold.<br>2. when the scheduling offset of the aperiodic CSI-RS is greater than or equal to a preset threshold, the CSI-RS and PDCCH/CORESET can be multiplexed on the same symbol, and the UE receives the CSI-RS and PDCCH/CORESET by using spatial QCL information of PDCCH/CORESET; if they are multiplexed on the same symbol, but not spatial QCL, the UE receives the aperiodic CSI-RS but does not receive the PDCCH/CORESET.<br>c) for the CSI-RS (such as NZP-CSI-RS, CSI-IM) used for channel measurement and interference measurement, similar to (1)<br>d) for the CSI-RS used for time-frequency tracking (or referred to as TRS), the CSI-RS and PDCCH/CORESET may be multiplexed on the same symbol, and the UE receives the CSI-RS and PDCCH/CORESET both using spatial QCL information of PDCCH/CORESET. |
| PDCCH/CORESET + PDCCH/CORESET | (1) for the QCL information (spatial reception parameters) for QCL type D<br>a) do not multiplex multiple PDCCHs/CORESETs on the same symbol or<br>b) multiple PDCCHs/CORESETs may be multiplexed on the same symbol but needs to be spatial QCL. |
| CSI-RS + SSB | (1) For QCL information (spatial reception parameters) of QCL type D, CSI-RS + PDCCH/CORESET is referred to, and PDCCH/CORESET may be replaced with SSB. |
| CSI-RS + CSI-RS | (1) For QCL information (spatial reception parameters) of QCL type D,<br>a) when two CSI-RSs are both CSI-RSs for beam management and a CSI-RS-ResourceRep parameter of a network configured with a CSI-RS resource set is ON,<br>i. the two CSI-RSs are periodic or semi-continuous CSI-RS + periodic or semi-continuous CSI-RSs or aperiodic CSI-RS + aperiodic CSI-RSs;<br>1. they may be multiplexed on the same symbol and the network configures exactly the same parameters for both CSI-RSs.<br>ii. the two CSI-RSs are periodic or semi-continuous CSI-RSs and non-periodic CSI-RSs;<br>1. the network configures the same spatial QCL information for the two CSI-RSs, or<br>2. multiplexing on the same symbol is not allowed.<br>b) when only 1 CSI-RS is used for beam management, and the CSI-RS-ResourceRep parameter of the CSI-RS resource set |

| channels or signals in the same OFDM symbol | same CC carrier or same BWP |
| --- | --- | configured by the network is ON and is a periodic CSI-RS or a semi-continuous CSI-RS;
i. when the other CSI-RS is a periodic CSI-RS or a semi-continuous CSI-RS (the CSI-RS used for beam management and the CSI-RS-ResourceRep parameter of the network configured with the CSI-RS resource set is OFF, or the CSI-RS used for channel measurement and interference measurement, or the CSI-RS used for time-frequency tracking)
1. referred to as the CSI-RS + SSB in b), the SSB is replaced by the periodic CSI-RS or the semi-continuous CSI-RS.
ii. when the other CSI-RS is the aperiodic CSI-RS,
1. the CSI-RS + PDSCH in the step b) can be referred, and the PDSCH in the CSI-RS is replaced by the aperiodic CSI-RS.
c) when only 1 CSI-RS is used for beam management and the CSI-RS-ResourceRep parameter of the CSI-RS resource set configured by the network is ON and is an aperiodic CSI-RS
i. when the other CSI-RS is a periodic CSI-RS or a semi-continuous CSI-RS;
1. see CSI-RS + SSB in c), SSB is replaced by periodic CSI-RS or semi-continuous CSI-RS.
ii. when the other CSI-RS is the aperiodic CSI-RS,
1. the CSI-RS + PDSCH in c) can be referred, and the PDSCH is replaced by the aperiodic CSI-RS.
d) when no CSI-RS is used for beam management and the CSI-RS-ResourceRep parameter of the CSI-RS resource set configured by the network is an ON
i. periodic CSI-RS or a semi-continuous CSI-RS plus a periodic CSI-RS or a semi-continuous CSI-RS;
1. reference may be made to periodic CSI-RS or semi-persistent CSI-RS + SSB, where SSB is replaced by periodic CSI-RS or semi-persistent CSI-RS.
ii. the periodic CSI-RS or the semi-continuous CSI-RS + the aperiodic CSI-RS
1. referred to the periodic CSI-RS or the semi-continuous CSI-RS + PDSCH, and the PDSCH is replaced by the aperiodic CSI-RS.
2. in addition, when the scheduling offsets of the two aperiodic CSI-RSs are both greater than or equal to the respective preset thresholds, the two aperiodic CSI-RSs may be multiplexed in the same symbol, and the spatial QCL information indicated in the most recently validated scheduling signaling is used.
Note: in the various "referring to" above, if the priorities of the two CSI-RSs are the same, they may also be multiplexed on the same symbol and configured and indicated as spatial QCLs, or multiplexed on the same symbol and one of the CSI-RSs uses the spatial QCL information of the other CSI-RS (when configured and indicated as different spatial QCL information), or only one of the CSI-RSs is transmitted and the other is discarded.
In addition, there is also a description of the multiplexing of CSI-RS + CSI-RS and QCL information determination method, as follows:
the periodic CSI-RS or the semi-persistent CSI-RS + the periodic CSI-RS or the semi-persistent CSI-RS
similar to the periodic CSI-RS or the semi-persistent CSI-RS + SSB
for the aperiodic CSI-RS for which the CSI-RS-ResourceRep parameter of the CSI-RS resource set configured by the network is ON, the network configures the same parameters for the two CSI-RSs
periodic CSI-RS or the semi-persistent CSI-RS + aperiodic CSI-RS
for the aperiodic CSI-RS for which the CSI-RS-ResourceRep parameter of the CSI-RS resource set configured by the network is OFF, similar to the periodic CSI-RS or the semi-persistent CSI-RS + PDSCH
for the aperiodic CSI-RS for which the CSI-RS-ResourceRep parameter of the CSI-RS resource set configured by the network is ON, the network configures the same parameters for the two CSI-RSs
aperiodic CSI-RS + aperiodic CSI-RS
when only 1 aperiodic CSI-RS is configured with the CSI-RS-ResourceRep parameter of CSI-RS resource set being OFF, it is similar to aperiodic CSI-RS + PDSCH. However, when the scheduling offsets of both the two aperiodic CSI-RSs are greater than or equal to the preset threshold, the two

| channels or signals in the same OFDM symbol | same CC carrier or same BWP |
|---|---|
| | aperiodic CSI-RSs are transmitted by using the QCL information which is recently validated.<br>when two aperiodic CSI-RS is configured with the CSI-RS-ResourceRep parameter of CSI-RS resource set being OFF, the network configures the two CSI-RSs with the same parameters. |
| PDSCH + PDSCH with differential RNTIs | For QCL information (spatial reception parameters) of QCL type D<br>a) scheduling offsets of two PDSCHs are all smaller than respective preset thresholds;<br>i. the 2 PDSCHs use the same spatial QCL information for the default TCI status indication.<br>b) when the scheduling offset of the 2 PDSCHs is larger than or equal to the respective preset threshold;<br>i. the 2 PDSCHs may be multiplexed on the same symbol and the spatial QCL information indicated by the TCI status when the DCI schedules both is the same.<br>c) when the scheduling offset of 1 PDSCH is smaller than a preset threshold, and the scheduling offset of another PDSCH is larger than or equal to the respective preset threshold;<br>i. the 2 PDSCHs may be multiplexed on the same symbol, and the PDSCHs with scheduling offset smaller than the preset threshold use spatial QCL information of PDSCHs with scheduling offset greater than or equal to the respective preset threshold. |
| SSB + SSB | Not multiplexed on the same symbol |
| PDSCH + PDSCH (C-RNTI + C-RNTI) | (1)for QCL information (spatial reception parameters) for QCL type D;<br>a) when the scheduling offset of the 2 PDSCHs is smaller than the preset threshold of each PDSCH,<br>i. 2 PDSCHs use the same spatial QCL information indicated by the default TCI state.<br>b) when the scheduling offset of the 2 PDSCHs is larger than or equal to the respective preset threshold;<br>i. the 2 PDSCHs may be multiplexed on the same symbol and the spatial QCL information indicated by the TCI status when the DCI schedules both is the same.<br>c) when the scheduling offset of 1 PDSCH is smaller than a preset threshold, and the scheduling offset of another PDSCH is larger than or equal to the respective preset threshold;<br>i. the 2 PDSCHs may be multiplexed on the same symbol, and the PDSCHs with scheduling offset smaller than the preset threshold use spatial QCL information of PDSCHs with scheduling offset greater than or equal to the respective preset threshold.<br>d) unlike a/b/c, 2 PDSCHs are not multiplexed on the same symbol. The spatial QCL information of the single-slot PDSCH scheduled by DCI is different from that of the multi-slot PDSCH scheduled by DCI. |
| RS for RRM (e.g. SSB for RRM or CSI-RS for RRM) + other channels or signals | Referring to the SSB + other channels or signals in the above tables, the SSB may be replaced by SSB/CSI-RS for RRM |

The above-mentioned PDSCH includes: scheduled single-slot PDSCH, scheduled multi-slot PDSCH (such as PDSCH slot aggregation), scheduled mini-slot PDSCH, and so on.

For the downlink channels and signals on different CCs, the criteria in the above steps can also be used.

If the spatial QCL information configured or indicated by the network side device is the same, the data transmission resources can be multiplexed on the same symbol.

If spatial QCL information configured or indicated by the network side device are different, then:

For periodic channel or signal+periodic channel or signal, the periodic channel or signal on PCell have a higher priority.

For periodic channel or signal+aperiodic channel or signal, the aperiodic channel or signal have a higher priority.

For aperiodic channel or signal+aperiodic channel or signal, the priority of the channel or signal for which the QCL information configured or indicated by the network side device becomes valid latest is the highest.

For the uplink channels and signals on the same CC or BWP, the criteria in the above steps can also be used. For example:

| channels or signals in the same OFDM symbol | same CC or same BWP |
|---|---|
| PUCCH + PUCCH | Not multiplexed on the same symbol |
| PUSCH + PUSCH | Not multiplexed on the same symbol |
| SRS + SRS | Not multiplexed on the same symbol |

For the uplink and the channels and signals on different CCs, the criteria in the above steps can also be used.

| channels or signals in the same OFDM symbol | different CCs |
|---|---|
| PUSCH + PUSCH | If the spatial QCL information configured or indicated by the network are the same, they may be multiplexed on the same symbol. |
| SRS + SRS | If the spatial QCL information configured or indicated by the network are different:<br>for periodic channel or signal + periodic channel or signal, the periodic channel or signal on PCell has a higher priority;<br>for periodic + aperiodic channel or signal, aperiodic channel or signal has a higher priority;<br>for aperiodic channel or signal + aperiodic channel or signal, the priority of the channel or signal for which the QCL information configured or indicated by the network side device becomes valid latest has a higher priority |
| PUCCH + PUCCH | If the spatial QCL information configured or indicated by the network are the same, they may be multiplexed on the same symbol.<br>if the spatial QCL information configured or indicated by the network are different, only one PUCCH can be transmitted. |

According to the combinations of various channels and signals given in these embodiments, combined with the methods and criteria involved in these embodiment, the transmitter and the receiver may determine whether multiple channels and signals can be multiplexed on the same symbol for simultaneous transmission and the QCL information used to achieve correct transmission of channels and signals. This embodiment provides a method for determining whether multiple channels and signals can be multiplexed on the same symbol for simultaneous transmission, and a QCL determining method when the multiple channels and signals are multiplexed on the same symbol, and a discarding method based on priority when the multiple channels and signals cannot be multiplexed.

According to the embodiments of the present disclosure, for the downlink or uplink, when different types of channels and signals are sent, it can be determined whether different types of channels and signals can be multiplexed in accordance with the agreed or network side equipment configuration criteria. Simultaneous transmission on the same symbol, and a QCL determining method when the multiple channels and signals are multiplexed on the same symbol, and a discarding method based on priority when the multiple channels and signals cannot be multiplexed. Therefore, the receiving end and the sending end have the same understanding of the relevant parameters of the transmission channel and signal, such as determining whether multiple channels and signals can be multiplexed on the same symbol for simultaneous transmission, and the QCL information used, so as to achieve the correct transmission of channels and signals.

A communication device applied to the sending end is further provided in the embodiment of the present disclosure, as shown in FIG. 3, the communication device includes:

a sending module 31, configured to, when transmitting at least two data transmission resources, send the data transmission resources, according to at least one of quasi-colocation (QCL) information of the data transmission resources and a preset rule, where a data transmission resource includes at least one of a signal and a channel.

In this embodiment, when there are at least two channels and signals to be transmitted, the channel and signal are transmitted according to at least one of the QCL information of the channel and the signal and the preset rule. According to the embodiment of the present disclosure, it is able to can make the communication devices at the sending end and the receiving end to consistently understand the relevant parameters of the channel and signal to be transmitted, such as determining whether multiple channels and signals can be multiplexed on the same symbol to be transmitted simultaneously, as well as the QCL information used, so as to achieve the correct transmission of channels and signals.

The signal includes a reference signal (reference signal, RS).

Further, the QCL information includes QCL information of type A, type B, and type C, and the sending module 31 is further configured to:

send the corresponding data transmission resource using respective QCL information of the at least two data transmission resources.

Further, the QCL information includes QCL information of type D, and the sending module 31 is further configured to:

determine whether the at least two data transmission resources are capable of being multiplexed to be transmitted in a same symbol;

in a case that the at least two data transmission resources are capable of being multiplexed to be transmitted in the same symbol, determine the QCL information of the data transmission resources, and sending the corresponding data transmission resource on the same symbol through the determined QCL information;

in a case that the at least two data transmission resources are not capable of being multiplexed to be transmitted in the same symbol, send the corresponding data transmission resource using respective QCL information of the at least two data transmission resources, or determine priorities of the at least two data transmission resources and sending the data transmission resource with a highest priority When the channel and signal to be transmitted are multiplexed on the same symbol, and the same spatial QCL information is configured and indicated, the same spatial QCL information can be used to transmit the channel and signal. The multiplexing mode may be frequency-division multiplexing (Frequency-division multiplexing, FDM).

When the channel and signal to be transmitted are multiplexed on the same symbol, but different spatial QCL information is configured and indicated, the channel or signal with low priority uses the spatial QCL information of the channel or signal with high priority and multiplexed on the same symbol for transmission, or only a channel or signal with a high priority is transmitted, but a channel or signal with a low priority is not transmitted.

When the channels and signals to be transmitted cannot be multiplexed on the same symbol, these channels and channels use their respective configurations and indicated spatial QCL information for transmission. In addition, the sending end may only send channels or signals with high priority, and does not send channels or signals with low priority.

Further, the sending module 31 is further configured to:

in a case that the at least two data transmission resources have same QCL information, send the at least two data transmission resources through the same QCL information; or in a case that the at least two data transmission resources have different QCL information, send the at least two data transmission resources through the QCL information of the data transmission resource with the highest priority, or sending the data transmission resource with the highest priority.

Further, the sending module 31 is further configured to determine the priorities of the data transmission resources according to at least one of:

method A: for the at least two data transmission resources, the priority of the data transmission resource for which the QCL information configured or indicated by a network side device is valid is higher than the priority of the data transmission resource for which the QCL information configured or indicated by the network side device is invalid, and the data transmission resource for which the QCL information configured or indicated by the network side device is invalid needs to use the default QCL information;

method B: for the at least two data transmission resources, the priority of the data transmission resource for aperiodic transmission is higher than the priority of the data transmission resource for periodic transmission;

method C: for at least two data transmission resources for aperiodic transmission, the priority of the data transmission resource for which the QCL information configured or indicated by the network side device becomes valid latest is the highest;

method D: for the data transmission resources for periodic transmission of different cells, the priority of the data transmission resource for a primary serving cell (PCell) is higher than the priority of the data transmission resource for a secondary serving cell (SCell);

method E: for the at least two data transmission resources, a priority of a physical downlink control channel (PDCCH) is higher than a priority of a physical downlink shared channel (PDSCH), and the priority of the PDSCH is higher than a priority of a channel state information reference signal (CSI-RS);

method F: for the at least two data transmission resources, a priority of a physical uplink shared channel (PUSCH) is higher than a priority of a physical uplink control channel (PUCCH), and the priority of the PUCCH is higher than a priority of a sounding reference signal (SRS).

Further, the sending module 31 is further configured to: determine priorities of the data transmission resources by using at least two methods of the methods A to F in a preset order.

Further, the sending module 31 is further configured to: after the priorities of the data transmission resources are determined by using a first method of the at least two methods in the preset order and at least two data transmission resources have a same priority, determining the priorities of the at least two data transmission resources by using the other methods of the at least two methods.

Further, the sending module 31 is further configured to: after the priorities of the data transmission resources are determined by using at least two methods of the methods A to F and at least two data transmission resources have the same priority, set the priorities of the at least two data transmission resources.

When at least two channels and signals need to be transmitted, the above multiple priority determining methods can be used to determine the priority. If the multiple priority determining methods are used, the order of the using of the selected multiple priority determining methods may be arbitrarily arranged to determine the channel and signal transmission method, that is, determining whether being multiplexed on the same symbol for transmission, and the used QCL information.

For example, when the priority determining method A and priority determining method B are selected, the priority of multiple channels and signals to be transmitted can be determined according to the priority determining method A. Then, the priorities of multiple channels and signals that cannot be determined according to the priority determining method A will be determined according to the priority determining method B. If there are channels or signals having the same priority after all the priority determining methods are used, the priorities thereof may be determined randomly, until all the priorities thereof are determined.

Further, the data transmission resources for periodic transmission includes at least one of: a synchronization signal block (SSB), a periodic CSI-RS, a semi-persistent CSI-RS, a periodic SRS, a semi-persistent SRS, a PDCCH, a PUCCH, a semi-static scheduling PDSCH, a semi-static scheduling PUSCH.

The data transmission resources for aperiodic transmission includes at least one of: an aperiodic CSI-RS, an aperiodic SRS, a dynamical scheduling PDSCH and a dynamical scheduling PUSCH.

Further, at least two channels and signals are multiplexed and transmitted on the same symbol, the sending module 31 is further configured to transmit only one beam at one time point.

Further, in the case that the data transmission resources are applied to a downlink, the at least two data transmission resources include at least one combination of:

an SSB and a PDSCH;
a CSI-RS and a PDSCH;
a PDCCH and a PDSCH;
a CSI-RS and a PDCCH;
a CSI-RS and an SSB;
a PDCCH and a PDCCH;
a CSI-RS and a CSI-RS;
a PDSCH and a PDSCH;
a reference signal (RS) for a radio resource management (RRM) and other channels or signals;

in a case that the data transmission resource is applied to an uplink, the data transmission resources includes at least one combination of:

a PUCCH and a PUCCH;
a PUSCH and a PUSCH;
an SRS and an SRS.

When the data transmission resource is applied to the downlink, the sending end is a network side device; when the data transmission resource is applied to the uplink, the sending end is a user equipment.

A communication device applied to the receiving end is further provided in an embodiment of the present disclosure also provides, as shown in FIG. 4, the communication device includes:

a receiving module 41, configured to, in a case that at least two data transmission resources are transmitted, receive the data transmission resources, according to at least one of quasi-colocation (QCL) information of the data transmission resources and a preset rule, where a data transmission resource includes at least one of a signal and a channel.

In this embodiment, when there are at least two channels and signals to be transmitted, the channel and signal are transmitted according to at least one of the QCL information of the channel and the signal and the preset rule. According to the embodiment of the present disclosure, it is able to can make the communication devices at the sending end and the receiving end to consistently understand the relevant parameters of the channel and signal to be transmitted, such as determining whether multiple channels and signals can be multiplexed on the same symbol to be transmitted simultaneously, as well as the QCL information used, so as to achieve the correct transmission of channels and signals.

Further, the signal includes a reference signal (RS).

Further, the QCL information includes QCL information of type A, type B and type C, and the receiving module 41 is further configured to:

receive the corresponding data transmission resource using respective QCL information of the at least two data transmission resources.

Further, where the QCL information includes QCL information of type D, and the receiving module 41 is further configured to:

determine whether the at least two data transmission resources are capable of being multiplexed to be transmitted in a same symbol;

in a case that the at least two data transmission resources are capable of being multiplexed to be transmitted in the same symbol, determining the QCL information of the data transmission resources, and receiving the corresponding data transmission resource on the same symbol through the determined QCL information;

in a case that the at least two data transmission resources are not capable of being multiplexed to be transmitted in the same symbol, receiving the corresponding data transmission resource using respective QCL information of the at least two data transmission resources, or determining priorities of the at least two data transmission resources and receiving the data transmission resource with a highest priority.

When the channel and signal to be transmitted are multiplexed on the same symbol, and the same spatial QCL information is configured and indicated, the same spatial QCL information can be used to transmit the channel and signal. The multiplexing mode may be FDM.

When the channel and signal to be transmitted are multiplexed on the same symbol, but different spatial QCL information is configured and indicated, the channel or signal with low priority uses the spatial QCL information of the channel or signal with high priority and multiplexed on the same symbol for transmission, or only a channel or signal with a high priority is transmitted, but a channel or signal with a low priority is not transmitted.

When the channels and signals to be transmitted cannot be multiplexed on the same symbol, these channels and channels use their respective configurations and indicated spatial QCL information for transmission. In addition, the receiving end may only send channels or signals with high priority, and does not receive channels or signals with low priority.

Further, the receiving module 41 is further configured to:

in a case that the at least two data transmission resources have same QCL information, receive the at least two data transmission resources through the same QCL information; or in a case that the at least two data transmission resources have different QCL information, receive the at least two data transmission resources through the QCL information of the data transmission resource with the highest priority, or receiving the data transmission resource with the highest priority.

Further, the receiving module 41 is further configured to determine the priorities of the data transmission resources according to at least one of:

method A: for the at least two data transmission resources, the priority of the data transmission resource for which the QCL information configured or indicated by a network side device is valid is higher than the priority of the data transmission resource for which the QCL information configured or indicated by the network side device is invalid;

method B: for the at least two data transmission resources, the priority of the data transmission resource for aperiodic transmission is higher than the priority of the data transmission resource for periodic transmission;

method C: for at least two data transmission resources for aperiodic transmission, the priority of the data transmission resource for which the QCL information configured or indicated by the network side device becomes valid latest is the highest;

method D: for the data transmission resources for periodic transmission of different cells, the priority of the data transmission resource for a primary serving cell (PCell) is higher than the priority of the data transmission resource for a secondary serving cell (SCell);

method E: for the at least two data transmission resources, a priority of a physical downlink control channel (PDCCH) is higher than a priority of a physical downlink shared channel (PDSCH), and the priority of the PDSCH is higher than a priority of a channel state information reference signal (CSI-RS);

method F: for the at least two data transmission resources, a priority of a physical uplink shared channel (PUSCH) is higher than a priority of a physical uplink control channel (PUCCH), and the priority of the PUCCH is higher than a priority of a sounding reference signal (SRS).

Further, the receiving module 41 is further configured to determine the priorities of the data transmission resources by using at least two methods of the methods A to F in a preset order.

Further, the receiving module 41 is further configured to: in a case that the priorities of the data transmission resources are determined by using a first method of the at least two methods in the preset order and at least two data transmission resources have a same priority, determine the priorities of the at least two data transmission resources by using the other methods of the at least two methods.

Further, the receiving module 41 is further configured to: in a case that the priorities of the data transmission resources are determined by using at least two methods of the methods A to F and at least two data transmission resources have the same priority, set the priorities of the at least two data transmission resources.

When at least two channels and signals need to be transmitted, the above multiple priority determining methods can be used to determine the priority. If the multiple priority determining methods are used, the order of the using of the selected multiple priority determining methods may be arbitrarily arranged to determine the channel and signal transmission method, that is, determining whether being multiplexed on the same symbol for transmission, and the used QCL information.

For example, when the priority determining method A and priority determining method B are selected, the priority of multiple channels and signals to be transmitted can be determined according to the priority determining method A. Then, the priorities of multiple channels and signals that cannot be determined according to the priority determining method A will be determined according to the priority determining method B. If there are channels or signals having the same priority after all the priority determining methods are used, the priorities thereof may be determined randomly, until all the priorities thereof are determined.

Further, the data transmission resources for periodic transmission includes at least one of: a synchronization signal block (SSB), a periodic CSI-RS, a semi-persistent CSI-RS, a periodic SRS, a semi-persistent SRS, a PDCCH, a PUCCH, a semi-static scheduling PDSCH, a semi-static scheduling PUSCH;

the data transmission resource for aperiodic transmission includes at least one of: an aperiodic CSI-RS, an aperiodic SRS, a dynamical scheduling PDSCH and a dynamical scheduling PUSCH.

Further, a multiplexing mode is a frequency division multiplexing.

Further, the receiving module 41 is further configured to receive one beam at one time point.

Further, in the case that the data transmission resources are applied to a downlink, the at least two data transmission resources include at least one combination of:
an SSB and a PDSCH;
a CSI-RS and a PDSCH;
a PDCCH and a PDSCH;
a CSI-RS and a PDCCH;
a CSI-RS and an SSB;
a PDCCH and a PDCCH;
a CSI-RS and a CSI-RS;
a PDSCH and a PDSCH;
a reference signal (RS) for a radio resource management (RRM) and other channels or signals;
in a case that the data transmission resource is applied to an uplink, the data transmission resources includes at least one combination of:
a PUCCH and a PUCCH;
a PUSCH and a PUSCH;
an SRS and an SRS.

When the data transmission resource is applied to the downlink, the receiving end is a user equipment; when the data transmission resource is applied to the uplink, the receiving end is a network side device.

A communication device is further provided in an embodiment of the present disclosure, including: a memory, a processor and a computer program stored in the memory and executable on the processor, where the processor executes the computer program to perform the channel and signal transmission method hereinabove.

The communication device may be a network side device or a user equipment. In the uplink, the communication device at the sending end is the user equipment, and the communication device at the receiving end is the network side device; in the downlink, the communication device at the sending end is the network side device, and the communication device at the receiving end is the user equipment.

Referring to FIG. 5 which is a structural diagram of a network side device in an embodiment of the present disclosure, which can realize the details of the channel and signal transmission method in the above-mentioned embodiment and achieve the same effect. As shown in FIG. 5, the network side device 500 includes: a processor 501, a transceiver 502, a memory 503, a user interface 504, and a bus interface.

In the embodiment of the present disclosure, the network side device 500 further includes: a computer program stored in the memory 503 and executable on the processor 501, and the processor 501 executes the computer program to: when transmitting at least two data transmission resources, send the data transmission resources, according to at least one of QCL information of the data transmission resources and a preset rule, where a data transmission resource includes at least one of a signal and a channel; or in a case that at least two data transmission resources are transmitted, receive the data transmission resources, according to at least one of QCL information of the data transmission resources and a preset rule, where a data transmission resource includes at least one of a signal and a channel.

In FIG. 5, the bus architecture may include any number of interconnected buses and bridges. Specifically, one or more processors represented by the processor 501 and various circuits of the memory represented by the memory 503 are linked together. The bus architecture can also link various other circuits such as peripheral devices, voltage regulators, power management circuits, etc., which are all known in the art, and therefore, no further descriptions are provided herein. The bus interface provides the interface. The transceiver 502 may be a plurality of elements, that is, including a transmitter and a receiver, and provide a unit for communicating with various other devices on the transmission medium. For different user equipment, the user interface 504 may also be an interface capable of externally connecting internally required equipment, and the connected equipment includes but not limited to a keypad, a display, a speaker, a microphone, a joystick, and the like.

The processor 501 is responsible for managing the bus architecture and general processing, and the memory 503 can store data used by the processor 501 when performing operations.

The network side equipment can be the base station (Base Transceiver Station, referred to as BTS) in Global System of Mobile Communications (GSM) or Code Division Multiple Access (Code Division Multiple Access, referred to as CDMA), or it can be broadband The base station (NodeB, NB) in Wideband Code Division Multiple Access (WCDMA), can also be the Evolutional Node B (eNB or eNodeB) in LTE, or a relay station or an access point, Or base stations in the future 5G network, etc., are not limited here.

Figure 6:
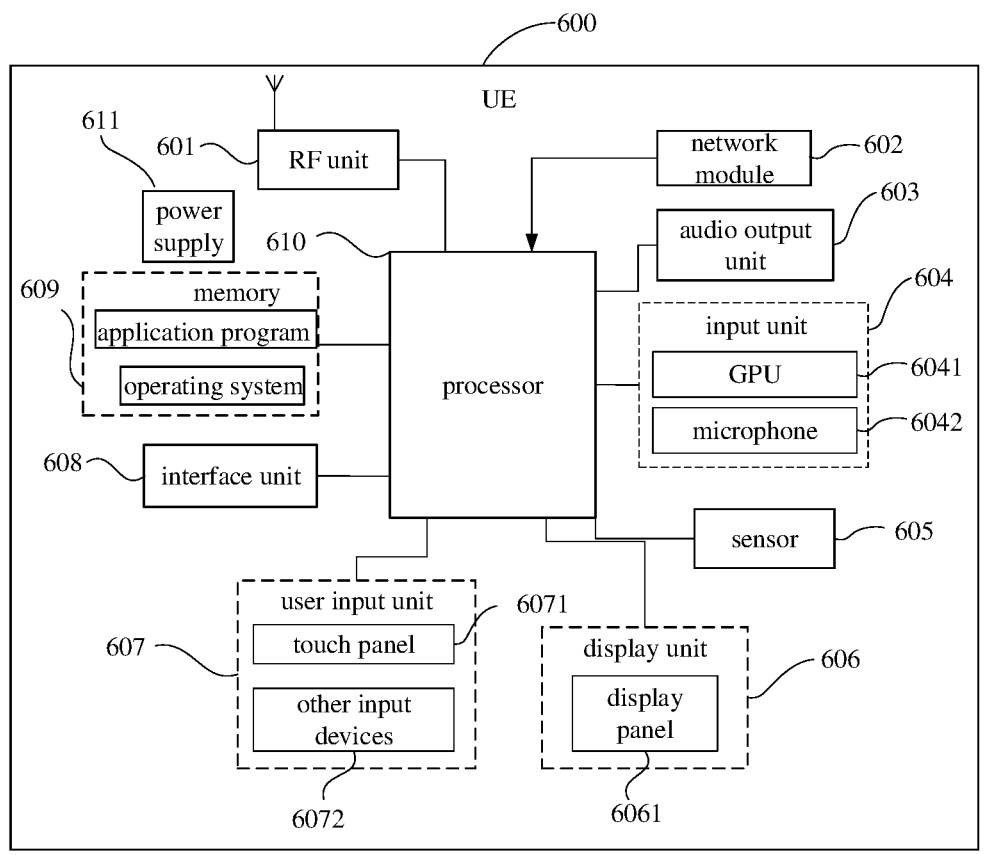
FIG. 6 is a schematic diagram of a composition of a user equipment in an embodiment of the disclosure.

Referring to FIG. 6. FIG. 6 is a structural diagram of a user equipment in an embodiment of the present disclosure, which can implement the details of the channel and signal transmission method in the above-mentioned embodiment and achieve the same effect. Referring to FIG. 6, the user equipment 600 includes but is not limited to: a radio frequency unit 601, a network module 602, an audio output unit 603, an input unit 604, a sensor 605, a display unit 606, a user input unit 607, an interface unit 608, a memory 609, a processing unit 610, and power supply 611. Those skilled in the art can understand that the structure of the user equipment shown in FIG. 6 does not constitute a limitation on the user equipment, and the user equipment may include more or less components than those shown in the figure, or a combination of certain components, or different components layout. In the embodiments of the present disclosure, user equipment includes, but is not limited to, mobile phones, tablet computers, notebook computers, palmtop computers, vehicle-mounted terminals, wearable devices, and pedometers.

The processor 610 performs the following steps: when transmitting at least two data transmission resources, sending the data transmission resources, according to at least one of QCL information of the data transmission resources and a preset rule, where a data transmission resource includes at least one of a signal and a channel; or in a case that at least two data transmission resources are transmitted, receiving the data transmission resources, according to at least one of QCL information of the data transmission resources and a preset rule, where a data transmission resource includes at least one of a signal and a channel.

It should be understood that, in the embodiment of the present disclosure, the radio frequency unit 601 can be used for receiving and sending signals in the process of sending and receiving information or talking. Specifically, the downlink data from the base station is received and processed by the processor 610; Uplink data is sent to the base station. Generally, the radio frequency unit 601 includes, but is not limited to, an antenna, at least one amplifier, a transceiver, a coupler, a low noise amplifier, a duplexer, and the like. In addition, the radio frequency unit 601 can also communicate with the network and other devices through a wireless communication system.

The user equipment provides the user with wireless broadband Internet access through the network module 602, such as helping the user to send and receive emails, browse web pages, and access streaming media.

The audio output unit 603 can convert the audio data received by the radio frequency unit 601 or the network module 602 or stored in the memory 609 into audio signals and output them as sounds. Moreover, the audio output unit 603 may also provide audio output related to a specific function performed by the user equipment 600 (for example, call signal reception sound, message reception sound, etc.). The audio output unit 603 includes a speaker, a buzzer, a receiver, and the like.

The input unit 604 is used to receive audio or video signals. The input unit 604 may include a graphics processing unit (GPU) 6041 and a microphone 6042. The graphics processor 6041 is configured to monitor images of still pictures or videos obtained by an image capture device (such as a camera) in a video capture mode or an image capture mode. The processed image frame may be displayed on the display unit 606. The image frames processed by the graphics processor 6041 may be stored in the memory 609 (or other storage medium) or sent via the radio frequency unit 601 or the network module 602. The microphone 6042 can receive sound, and can process such sound into audio data. The processed audio data can be converted into a format that can be sent to a mobile communication base station via the radio frequency unit 601 for output in the case of a telephone call mode.

The user equipment 600 also includes at least one sensor 605, such as a light sensor, a motion sensor, and other sensors. Specifically, the light sensor includes an ambient light sensor and a proximity sensor. The ambient light sensor can adjust the brightness of the display panel 6061 according to the brightness of the ambient light. The proximity sensor can close the display panel 6061 and/or backlight and the display panel 6061 when the user equipment 600 is moved to the ear. As a kind of motion sensor, the accelerometer sensor can detect the magnitude of acceleration in various directions (usually three-axis), and can detect the magnitude and direction of gravity when it is stationary, which can be used to identify the user equipment posture (such as horizontal and vertical screen switching, related games, magnetometer attitude calibration), vibration recognition related functions (such as pedometer, percussion), etc.; sensor 605 can also include fingerprint sensors, pressure sensors, iris sensors, molecular sensors, gyroscopes, barometers, hygrometers, thermometers, Infrared sensors, etc., will not be repeated here.

The display unit 606 is used to display information input by the user or information provided to the user. The display unit 606 may include a display panel 6061, and the display panel 6061 may be configured in the form of a liquid crystal display (LCD), an organic light-emitting diode (OLED), etc.

The user input unit 607 may be used to receive inputted number or character information, and generate key signal input related to user settings and function control of the user equipment. Specifically, the user input unit 607 includes a touch panel 6071 and other input devices 6072. The touch panel 6071, also called a touch screen, can collect the user's touch operations on or near it (for example, the user uses any suitable objects or accessories such as fingers, stylus, etc.) on the touch panel 6071 or near the touch panel 6071). The touch panel 6071 may include two parts: a touch detection device and a touch controller. The touch detection device detects the user's touch position, and detects the signal brought by the touch operation, and transmits the signal to the touch controller; the touch controller receives the touch information from the touch detection device, converts it into contact coordinates, and then sends it to the processor 610, the command sent by the processor 610 is received and executed.

In addition, the touch panel 6071 can be implemented in multiple types such as resistive, capacitive, infrared, and surface acoustic wave. In addition to the touch panel 6071, the user input unit 607 may also include other input devices 6072. Specifically, other input devices 6072 may include, but are not limited to, a physical keyboard, function keys (such as volume control buttons, switch buttons, etc.), trackball, mouse, and joystick, which will not be repeated here. Further, the touch panel 6071 can cover the display panel 6061. When the touch panel 6071 detects a touch operation on or near it, it transmits it to the processor 610 to determine the type of the touch event, and then the processor 610 responds to the touch type of event provides corresponding visual output on the display panel 6061. Although in FIG. 6, the touch panel 6071 and the display panel 6061 are used as two independent components to implement the input and output functions of the user equipment, in some embodiments, the touch panel 6071 and the display panel 6061 can be integrated The implementation of the input and output functions of the user equipment is not specifically limited here.

The interface unit 608 is an interface for connecting an external device with the user equipment 600. For example, the external device may include a wired or wireless headset port, an external power source (or battery charger) port, a wired or wireless data port, a memory card port, a port for connecting a device with an identification module, audio input/output (I/O) port, video I/O port, headphone port, etc. The interface unit 608 can be used to receive input (for example, data information, power, etc.) from an external device and transmit the received input to one or more elements in the user equipment 600 or can be used to connect to the user equipment 600 and external Transfer data between devices.

The memory 609 can be used to store software programs and various data. The memory 609 may mainly include a storage program area and a storage data area. The storage program area may store an operating system, an application program required by at least one function (such as a sound playback function, an image playback function, etc.), etc.; Data (such as audio data, phone book, etc.) created by the use of mobile phones. In addition, the memory 609 may include a high-speed random access memory, and may also include a non-volatile memory, such as at least one magnetic disk storage device, a flash memory device, or other volatile solid-state storage devices.

The processor 610 is the control center of the user equipment. It uses various interfaces and lines to connect the various parts of the entire user equipment. It runs or executes software programs and/or modules stored in the memory 609, and calls data stored in the memory 609. To perform various functions of the user equipment and process data to monitor the user equipment as a whole. The processor 610 may include one or more processing units; preferably, the processor 610 may integrate an application processor and a modem processor, where the application processor mainly processes the operating system, user interface and application programs, etc. The processor mainly deals with wireless communication. It can be understood that the foregoing modem processor may not be integrated into the processor 610.

The user equipment 600 may also include a power supply 611 (such as a battery) for supplying power to various components. Preferably, the power supply 611 may be logically connected to the processor 610 through a power management system, so as to manage charging, discharging, and power consumption management through the power management system and other functions.

In addition, the user equipment 600 includes some functional modules not shown, which will not be repeated here.

The embodiments of the present disclosure also provide a computer-readable storage medium having a computer program stored on the computer-readable storage medium, and when the computer program is executed by a processor, the above-mentioned channel and signal transmission method step.

It can be understood that the embodiments described herein can be implemented by hardware, software, firmware, middleware, microcode, or a combination thereof. For hardware implementation, the processing unit can be implemented in one or more application specific integrated circuits (ASICs), digital signal processors (Digital Signal Processing, DSP), digital signal processing devices (DSP Device, DSPD), programmable Logic device (Programmable Logic Device, PLD), Field-Programmable Gate Array (Field-Programmable Gate Array, FPGA), general-purpose processors, controllers, microcontrollers, microprocessors, and others for performing the functions described in the present disclosure Electronic unit or its combination.

For software implementation, the technology described herein can be implemented through modules (such as procedures, functions, etc.) that perform the functions described herein. The software codes can be stored in the memory and executed by the processor. The memory can be implemented in the processor or external to the processor.

The various embodiments in this specification are described in a progressive manner. Each embodiment focuses on the differences from other embodiments, and the same or similar parts between the various embodiments can be referred to each other.

Those skilled in the art should understand that the embodiments of the embodiments of the present disclosure may be provided as methods, devices, or computer program products. Therefore, the embodiments of the present disclosure may adopt the form of a complete hardware embodiment, a complete software embodiment, or an embodiment combining software and hardware. Moreover, the embodiments of the present disclosure may take the form of computer program products implemented on one or more computer-usable storage media (including but not limited to disk storage, CD-ROM, optical storage, etc.) containing computer-usable program codes.

The embodiments of the present disclosure are described with reference to the flowcharts and/or block diagrams of the methods, terminal devices (systems), and computer program products according to the embodiments of the present disclosure. It should be understood that each process and/or block in the flowchart and/or block diagram, and the combination of processes and/or blocks in the flowchart and/or block diagram can be implemented by computer program instructions. These computer program instructions can be provided to the processors of general-purpose computers, special-purpose computers, embedded processors, or other programmable data processing terminal equipment to generate a machine, so that instructions executed by the processor of the computer or other programmable data processing terminal equipment for realizing the functions specified in one flow or multiple flows in the flowchart and/or one block or multiple blocks in the block diagram is generated.

These computer program instructions can also be stored in a computer-readable memory that can guide a computer or other programmable data processing terminal equipment to work in a specific manner, so that the instructions stored in the computer-readable memory produce an article of manufacture including the instruction device. The instruction device implements the functions specified in one process or multiple processes in the flowchart and/or one block or multiple blocks in the block diagram.

These computer program instructions can also be loaded on a computer or other programmable data processing terminal equipment, so that a series of operation steps are performed on the computer or other programmable terminal equipment to produce computer-implemented processing, so that the computer or other programmable terminal equipment The instructions executed above provide steps for implementing functions specified in a flow or multiple flows in the flowchart and/or a block or multiple blocks in the block diagram.

Although some embodiments of the present disclosure have been described, those skilled in the art can make additional changes and modifications to these embodiments once they learn the basic creative concept. Therefore, the appended claims are intended to be interpreted as including the preferred embodiments and all changes and modifications falling within the scope of the embodiments of the present disclosure.

It should also be noted that in the present disclosure, relational terms such as first and second are only used to distinguish one entity or operation from another entity or operation, and do not necessarily require or imply that there is any such actual relationship or order between these entities or operations. Moreover, the terms "include", "including" or any other variants thereof are intended to cover non-exclusive inclusion, so that a process, method, article or terminal device including a series of elements not only includes those elements, but also includes those that are not explicitly listed. Other elements listed, or also include elements inherent to this process, method, article or terminal device. If there are no more restrictions, the element defined by the sentence "including a . . . " does not exclude the existence of other identical elements in the process, method, article or terminal device that includes the element.

The above are some embodiments of the present disclosure. It should be pointed out that for those of ordinary skill in the art, several improvements and modifications can be made without departing from the principles described in the present disclosure, and these improvements and modifications also fall into the scope of the present disclosure.

What is claimed is:

1. A channel and signal transmission method, performed by a communication device at a receiving end, comprising:
   in a case that at least two data transmission resources are received by the communication device at the receiving end, receiving the data transmission resources, according to at least one of quasi-colocation (QCL) information of the data transmission resources and a preset rule, wherein a data transmission resource comprises at least one of a signal and a channel;
   wherein the QCL information comprises QCL information of type D, and the method further comprises:
   determining whether the at least two data transmission resources are capable of being multiplexed to be transmitted in a same symbol;
   in a case that the at least two data transmission resources are capable of being multiplexed to be transmitted in the same symbol, determining the QCL information of the data transmission resources, and receiving the corresponding data transmission resource on the same symbol through the determined QCL information; and
   in a case that the at least two data transmission resources are not capable of being multiplexed to be transmitted in the same symbol, receiving the corresponding data transmission resource using respective QCL information of the at least two data transmission resources, or determining priorities of the at least two data transmission resources and receiving the data transmission resource with a highest priority.

2. The channel and signal transmission method according to claim 1, wherein the signal comprises a reference signal (RS).

3. The channel and signal transmission method according to claim 1, wherein the determining the QCL information of the data transmission resources and receiving the corresponding data transmission resource on the same symbol through the determined QCL information in the case that the at least two data transmission resources are capable of being multiplexed to be transmitted in the same symbol comprises:
   in a case that the at least two data transmission resources have same QCL information, receiving the at least two data transmission resources through the same QCL information; or
   in a case that the at least two data transmission resources have different QCL information, receiving the at least two data transmission resources through the QCL information of the data transmission resource with the highest priority, or receiving the data transmission resource with the highest priority.

4. The channel and signal transmission method according to claim 1, wherein the priorities of the data transmission resources are determined according to at least one of:
   method A: for the at least two data transmission resources, the priority of the data transmission resource for which the QCL information configured or indicated by a network side device is valid is higher than the priority of the data transmission resource for which the QCL information configured or indicated by the network side device is invalid;
   method B: for the at least two data transmission resources, the priority of the data transmission resource for aperiodic transmission is higher than the priority of the data transmission resource for periodic transmission;
   method C: for at least two data transmission resources for aperiodic transmission, the priority of the data transmission resource for which the QCL information configured or indicated by the network side device becomes valid latest is the highest;
   method D: for the data transmission resources for periodic transmission of different cells, the priority of the data transmission resource for a primary serving cell (PCell) is higher than the priority of the data transmission resource for a secondary serving cell (SCell);
   method E: for the at least two data transmission resources, a priority of a physical downlink control channel (PDCCH) is higher than a priority of a physical downlink shared channel (PDSCH), and the priority of the PDSCH is higher than a priority of a channel state information reference signal (CSI-RS);
   method F: for the at least two data transmission resources, a priority of a physical uplink shared channel (PUSCH) is higher than a priority of a physical uplink control channel (PUCCH), and the priority of the PUCCH is higher than a priority of a sounding reference signal (SRS).

5. The channel and signal transmission method according to claim 4, wherein the priorities of the data transmission resources are determined by using at least two methods of the methods A to F in a preset order.

6. The channel and signal transmission method according to claim 5, wherein in a case that the priorities of the data transmission resources are determined by using a first method of the at least two methods in the preset order and at least two data transmission resources have a same priority, the priorities of the at least two data transmission resources are determined by using the other methods of the at least two methods.

7. The channel and signal transmission method according to claim 6, wherein in a case that the priorities of the data transmission resources are determined by using at least two methods of the methods A to F and at least two data transmission resources have the same priority, the priorities of the at least two data transmission resources are set.

8. The channel and signal transmission method according to claim 4, wherein the data transmission resources for periodic transmission comprises at least one of:
   a synchronization signal block (SSB), a periodic CSI-RS, a semi-persistent CSI-RS, a periodic SRS, a semi-persistent SRS, a PDCCH, a PUCCH, a semi-static scheduling PDSCH, a semi-static scheduling PUSCH;
   the data transmission resource for aperiodic transmission comprises at least one of: an aperiodic CSI-RS, an aperiodic SRS, a dynamical scheduling PDSCH and a dynamical scheduling PUSCH.

9. The channel and signal transmission method according to claim 1, wherein in the case that the data transmission resources are applied to a downlink, the at least two data transmission resources comprise at least one combination of:

an SSB and a PDSCH;
a CSI-RS and a PDSCH;
a PDCCH and a PDSCH;
a CSI-RS and a PDCCH;
a CSI-RS and an SSB;
a PDCCH and a PDCCH;
a CSI-RS and a CSI-RS;
a PDSCH and a PDSCH;
a reference signal (RS) for a radio resource management (RRM) and other channels or signals;
in a case that the data transmission resource is applied to an uplink, the data transmission resources comprises at least one combination of:
a PUCCH and a PUCCH;
a PUSCH and a PUSCH;
an SRS and an SRS.

10. A communication device at a receiving end, comprising: a memory, a processor and a computer program stored in the memory and executable on the processor, wherein the processor executes the computer program to:
in a case that at least two data transmission resources are received by the communication device at the receiving end, receive the data transmission resources, according to at least one of quasi-colocation (QCL) information of the data transmission resources and a preset rule, wherein a data transmission resource comprises at least one of a signal and a channel;
wherein the QCL information comprises QCL information of type D, and the processor executes the computer program to:
determine whether the at least two data transmission resources are capable of being multiplexed to be transmitted in a same symbol;
in a case that the at least two data transmission resources are capable of being multiplexed to be transmitted in the same symbol, determine the QCL information of the data transmission resources, and receive the corresponding data transmission resource on the same symbol through the determined QCL information; and
in a case that the at least two data transmission resources are not capable of being multiplexed to be transmitted in the same symbol, receive the corresponding data transmission resource using respective QCL information of the at least two data transmission resources, or determine priorities of the at least two data transmission resources and receive the data transmission resource with a highest priority.

11. The communication device according to claim 10, wherein the signal comprises a reference signal (RS).

12. The communication device according to claim 10, wherein the processor executes the computer program to:
in a case that the at least two data transmission resources have same QCL information, receive the at least two data transmission resources through the same QCL information; or
in a case that the at least two data transmission resources have different QCL information, receive the at least two data transmission resources through the QCL information of the data transmission resource with the highest priority, or receive the data transmission resource with the highest priority.

13. The communication device according to claim 10, wherein the priorities of the data transmission resources are determined according to at least one of:
method A: for the at least two data transmission resources, the priority of the data transmission resource for which the QCL information configured or indicated by a network side device is valid is higher than the priority of the data transmission resource for which the QCL information configured or indicated by the network side device is invalid;
method B: for the at least two data transmission resources, the priority of the data transmission resource for aperiodic transmission is higher than the priority of the data transmission resource for periodic transmission;
method C: for at least two data transmission resources for aperiodic transmission, the priority of the data transmission resource for which the QCL information configured or indicated by the network side device becomes valid latest is the highest;
method D: for the data transmission resources for periodic transmission of different cells, the priority of the data transmission resource for a primary serving cell (PCell) is higher than the priority of the data transmission resource for a secondary serving cell (SCell);
method E: for the at least two data transmission resources, a priority of a physical downlink control channel (PDCCH) is higher than a priority of a physical downlink shared channel (PDSCH), and the priority of the PDSCH is higher than a priority of a channel state information reference signal (CSI-RS);
method F: for the at least two data transmission resources, a priority of a physical uplink shared channel (PUSCH) is higher than a priority of a physical uplink control channel (PUCCH), and the priority of the PUCCH is higher than a priority of a sounding reference signal (SRS).

14. The communication device according to claim 13, wherein the priorities of the data transmission resources are determined by using at least two methods of the methods A to F in a preset order.

15. The communication device according to claim 14, wherein in a case that the priorities of the data transmission resources are determined by using a first method of the at least two methods in the preset order and at least two data transmission resources have a same priority, the priorities of the at least two data transmission resources are determined by using the other methods of the at least two methods.

16. The communication device according to claim 15, wherein in a case that the priorities of the data transmission resources are determined by using at least two methods of the methods A to F and at least two data transmission resources have the same priority, the priorities of the at least two data transmission resources are set.

17. The communication device according to claim 13, wherein the data transmission resources for periodic transmission comprises at least one of:
a synchronization signal block (SSB), a periodic CSI-RS, a semi-persistent CSI-RS, a periodic SRS, a semi-persistent SRS, a PDCCH, a PUCCH, a semi-static scheduling PDSCH, a semi-static scheduling PUSCH;
the data transmission resource for aperiodic transmission comprises at least one of: an aperiodic CSI-RS, an aperiodic SRS, a dynamical scheduling PDSCH and a dynamical scheduling PUSCH.

18. The communication device according to claim 10, wherein in the case that the data transmission resources are applied to a downlink, the at least two data transmission resources comprise at least one combination of:
an SSB and a PDSCH;
a CSI-RS and a PDSCH;
a PDCCH and a PDSCH;
a CSI-RS and a PDCCH;
a CSI-RS and an SSB;

a PDCCH and a PDCCH;
a CSI-RS and a CSI-RS;
a PDSCH and a PDSCH;
a reference signal (RS) for a radio resource management (RRM) and other channels or signals;
in a case that the data transmission resource is applied to an uplink, the data transmission resources comprises at least one combination of:
a PUCCH and a PUCCH;
a PUSCH and a PUSCH;
an SRS and an SRS.

* * * * *